United States Patent
Ovsiannikov

(10) Patent No.: US 8,564,688 B2
(45) Date of Patent: Oct. 22, 2013

(54) METHODS, SYSTEMS AND APPARATUSES FOR WHITE BALANCE CALIBRATION

(75) Inventor: Ilia Ovsiannikov, Studio City, CA (US)

(73) Assignee: Aptina Imaging Corporation, George Town (KY)

( * ) Notice: Subject to any disclaimer, the term of this patent is extended or adjusted under 35 U.S.C. 154(b) by 841 days.

(21) Appl. No.: 12/232,231

(22) Filed: Sep. 12, 2008

(65) Prior Publication Data

US 2010/0066857 A1    Mar. 18, 2010

(51) Int. Cl.
*H04N 9/73* (2006.01)
*H04N 17/00* (2006.01)

(52) U.S. Cl.
USPC .................. 348/223.1; 348/187; 348/191

(58) Field of Classification Search
USPC ................ 348/223.1, 246, 247; 382/162, 167
See application file for complete search history.

(56) References Cited

U.S. PATENT DOCUMENTS

| | | | |
|---|---|---|---|
| 5,805,213 A | 9/1998 | Spaulding et al. | |
| 6,594,388 B1 | 7/2003 | Gindele et al. | |
| 7,081,918 B2 | 7/2006 | Takemoto | |
| 7,158,174 B2 | 1/2007 | Gindele et al. | |
| 7,199,822 B2 | 4/2007 | Fujino | |
| 7,265,781 B2 | 9/2007 | Noguchi | |
| 7,583,297 B2 * | 9/2009 | Yamada | 348/224.1 |
| 2002/0130959 A1 * | 9/2002 | McGarvey | 348/223 |
| 2005/0195289 A1 | 9/2005 | Jacobs et al. | |
| 2005/0270383 A1 | 12/2005 | Hung | |
| 2007/0047803 A1 | 3/2007 | Nikkanen | |
| 2007/0058223 A1 * | 3/2007 | Matsuura | 358/518 |

OTHER PUBLICATIONS

Chan-Ho Han, et al., "Color Correction Method for CMOS Camera Phone Image," 2004 IEEE, pp. 138-141.

* cited by examiner

*Primary Examiner* — Joel Fosselman
(74) *Attorney, Agent, or Firm* — Louis R. Levenson; Nancy Y. Ru

(57) ABSTRACT

Methods, systems and apparatuses for white balance calibration. A calibration correction matrix is specifically calibrated for each individual imager, thereby providing improved automatic white balance performance. The individual imager calibration corrects for variation of the spectral response among different imagers. The calibration correction matrix is placed before the gray checker module, which analyzes the chromaticity of the image pixels and supplies resulting statistics to the automatic white balance decision engine for use in automatic white balance operations. The calibration correction matrix may be implemented as a 3×3 matrix.

21 Claims, 6 Drawing Sheets

METHODS, SYSTEMS AND APPARATUSES FOR WHITE BALANCE CALIBRATION

FIELD OF THE INVENTION

Disclosed embodiments relate generally to imagers, and more particularly to methods, systems and apparatuses for the calibration of imagers for an improved automatic white balance function.

BACKGROUND OF THE INVENTION

Imagers typically have an array of pixels containing photosensors, where each pixel produces a signal corresponding to the intensity of light impinging on that element when an image is focused on the pixel array. The signals may then be digitized and stored, for example, for subsequent display of a corresponding image on a monitor, or for providing hardcopy images, or for providing information about the captured image.

When capturing a color image photosensors must be able to separately detect color components of the captured image. One of the most challenging problems in color image processing is adjusting the color gains of the system to compensate for the variations in the illumination spectra incident on the imager due to the illumination source, also known as white balance. For example, when a digital camera is moved from outdoors (sunlight) to indoor fluorescent or incandescent light conditions, the color in the image may shift. If an image of a white card looks white when indoors, for example, it might look bluish outside. If it looks white under fluorescent light, it might look yellowish under an incandescent lamp.

In order to compensate for changes in illumination spectra, the gains of the color processing systems and/or imager should be adjusted, using for example, automatic white balance techniques. Automatic white balance relies on accurately measuring the color pixels of the image. During manufacturing, color characteristics of imagers may vary substantially. An imager with color characteristics that are substantially different from those that the automatic white balance assumes may result in a malfunction of the automatic white balance.

Accordingly, there is a need and desire for methods, systems and apparatuses for calibrating imagers to provide an improved automatic white balance function.

DETAILED DESCRIPTION OF THE INVENTION

In the following detailed description, reference is made to the accompanying drawings which form a part hereof, and in which are shown by way of illustration specific embodiments that may be practiced. It should be understood that like reference numbers represent like elements throughout the drawings. These example embodiments are described in sufficient detail to enable those skilled in the art to practice them. It is to be understood that other embodiments may be utilized, and that structural, material, and electrical changes may be made, only some of which are discussed in detail below.

In the following description, the embodiments are described in relation to a CMOS imager for convenience purposes only; the disclosed embodiments, however, have wider applicability to automatic white balance operations for pixel output signals from any type of imager, including CCD imagers.

For photosensors to capture a color image, they must be able to separately detect color components of the captured image. For example when using a Bayer pattern, as shown for example in FIG. 1, photons having a wavelength corresponding to red, green or blue light are detected by respective red, green, and blue pixels (i.e., each pixel is sensitive only to one color spectral band). For this to occur, a color filter array (CFA) is typically placed in front of the pixel array so that each pixel receives the light of the color of its associated filter according to a specific pattern, e.g., the Bayer pattern 10 of FIG. 1. Other color filter array patterns are also known in the art and are applicable as well.

Figure 1:
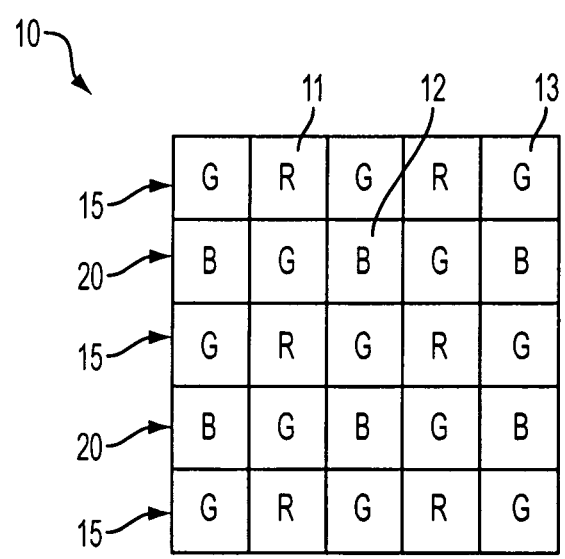
FIG. 1 shows a Bayer color filter pattern.

As shown in FIG. 1, the Bayer pattern 10 is an array of repeating red (R), green (G), and blue (B) filters. A red pixel is a pixel covered by a red filter; similarly, a blue pixel or a green pixel is a pixel covered by a blue or a green filter, respectively. In the Bayer pattern 10, red pixels 11, green pixels 13 and blue pixels 12 are arranged so that alternating red 11 and green 13 pixels are in one row 15 of a pixel array, and alternating blue 12 and green 13 pixels are in a next row 20. These alternating rows 15, 20 are repeated throughout the pixel array. Thus, when the imager is read out, the pixel sequence for one row (i.e., row 15) reads GRGRGR, etc., and the sequence for the next row (i.e., row 20) reads BGBGBG, etc. While FIG. 1 depicts an array having only five rows and five columns, pixel arrays typically have hundreds or thousands of rows and columns of pixels.

One of the most challenging problems in color image processing is adjusting the color gains of the system to compensate for the variations in the illumination spectra incident on the imager due to the illumination source, also known as white balance. This problem stems from the fact that spectral emission curves of common sources of illumination are significantly different from each other. For example, in accordance with Plank's law, the spectral energy curve of the sun is shifted towards the shorter wavelengths relative to the spectral energy curve of an incandescent light source. Therefore, the sun can be considered to be a "blue-rich" illuminator while an incandescent bulb can be considered to be a "red-rich" illuminator. As a result, if the color processing settings are not adjusted, scenes illuminated by the sunlight tend to produce "bluish" imagery, while scenes illuminated by an incandescent source tend to appear "reddish."

The human eye and brain are capable of "white balancing." If a person takes a white card outside, it looks white. If he takes it inside and views it under fluorescent lights, it looks white. When viewed under an incandescent light bulb, the card still looks white. Even when placed under a yellow light bulb, within a few minutes, the card will look white. With each of these light sources, the white card is reflecting a different color spectrum, but the brain is smart enough to make it look white.

Obtaining the same result with a camera or other imager is harder. When the white card moves from light source to light source, an imager "sees" different colors under the different conditions. Consequently, when a digital camera is moved from outdoors (sunlight) to indoor fluorescent or incandescent light conditions, the color in the image shifts. If the white card looks white when indoors, for example, it might look bluish outside. If it looks white under fluorescent light, it might look yellowish under an incandescent lamp.

In order to compensate for changes in illumination spectra, the gains of the color processing systems and/or imager should be adjusted. This adjustment is usually performed to preserve the overall luminance (brightness) of the image. As a result of proper adjustment, gray/white areas of the image appear gray/white on the image-rendering device (hence the term "white balance"). In the absence of specific knowledge of the spectra of the illumination source, this adjustment can be performed based on inference of the spectra of illumination from an analysis of the image itself.

The most commonly used approach to computing the proper adjustment to the color channel gains is based on the premise that in complex images all colors are equally present in the image. Based on this assumption, the sums of all red, green and blue components in the image should be equal (in other words, the image should average to gray). Following this approach, the overall (average over the entire image) luminance Y, and red (R_avg), green (G_avg) and blue (B_avg) components are evaluated. The color gains (g_red, g_green, g_blue) are then selected so that Y=[g_red]*R_avg=[g_green]*G_avg=[g_blue]*B_avg.

In most instances, no color shift is desired in the resulting captured image. Or, conversely, some times a controlled color shift may be desired that differs from that which naturally occurs as a result of various light sources in the captured image. In the case where a color shift is to be removed, one may appropriately set the white balance to account for any color shifts resulting from non-white light sources. In digital imagers, the white balance may be set by appropriately gaining or amplifying the digital outputs of the pixel array for the different pixel colors. For example, in an red, green and blue array, as employed with a Bayer pattern, a picture with a bluish cast or one that is captured using a light source with a high color temperature may be made less blue by modifying the red, green and blue digital outputs accordingly to shift the overall color balance. The challenge, of course, is in determining to what degree to modify the red, green and blue digital outputs.

Automatic white balance relies on accurately measuring the color pixels of the image. During manufacturing, color characteristics of imagers may vary substantially. An imager with color characteristics that are substantially different from those that the automatic white balance assumes may result in a malfunction of the automatic white balance.

To ensure accurate performance of the automatic white balance operation, the imager can be calibrated. One way to calibrate the imager is to capture a flat field image, calculate the average response of the red, green and blue channels, calculate the ratios R/G and B/G and store these ratios in the imager. However, this method works only when the shape of the spectral response curves does not vary from imager to imager.

The spectral response curve indicates how much current the cell can generate from light energy at each wavelength of light (e.g., reflected intensity vs. wavelength). It is a fixed characteristic of the cell that is independent of the illuminant. The spectral response curves for various imager modules are dependent on the thickness and location of the various layers of the imager. Therefore, the spectral response curve for different imager modules will vary based on the manufacturing tolerances, etc. that are used.

Imager calibration is required to ensure reliable performance of automatic white balance in situations where substantial manufacturing variance of imager spectral characteristics exists. R/G and B/G gain ratios can be calibrated during manufacturing to improve automatic white balance performance. This may be sufficient if the relative sensitivity of the red, green and blue color channels in the imager varies while the shape of the spectral response curves does not. It has been shown, however, that the shape of spectral response does vary and thus, that R/G and B/G calibration may not be sufficient.

Disclosed embodiments provide improved automatic white balance performance by providing a calibration correction matrix that is specifically calibrated for each imager and thus, is able to correct for variation of the spectral response among different imagers. In implementation, the calibration correction matrix is placed before a gray checker module that processes automatic white balance statistics (see calibration matrix 120f in FIG. 3).

The gray checker module analyzes the chromaticity of the image pixels and supplies resulting statistics to the automatic white balance decision engine for use in automatic white balance operations. Variations in spectral response of the red, green and blue color channels may cause the gray checker module to produce inaccurate statistics, which results in degraded white balance performance. By placing the calibration correction matrix of the disclosed embodiments at the input of the gray checker module, the spectral curve variations will be substantially compensated for.

The calibration correction matrix may be implemented as a 3×3 matrix. Thus, calibration requires calculation of nine (9) coefficients for the matrix and storing them in the imager. This is done during imager manufacturing. It should be noted that less than nine coefficients may be needed in some cases, depending on the amount of variation present between the spectral curves. The calibration will result in a matrix, such as that shown in Equation (1):

$$C_{calib} = \begin{vmatrix} a & b & c \\ d & e & f \\ g & h & i \end{vmatrix}, \quad (1)$$

where $C_{calib}$ represents the calibration correction matrix and each coefficient a, b, c, d, e, f, g, h, and i is one of the calibration correction coefficients determined during calibration of the imager.

Figure 4:
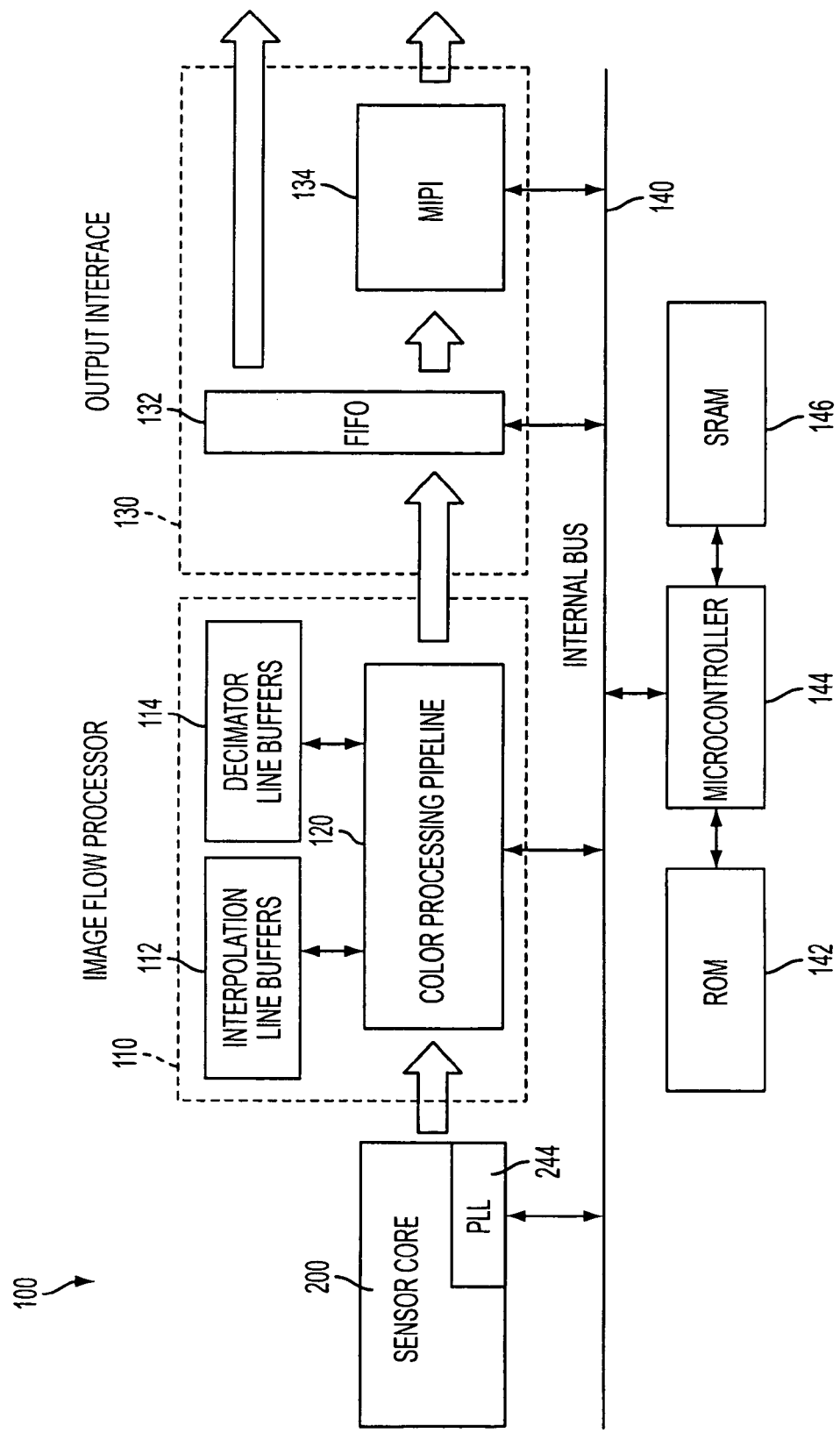
FIG. 4 is a block diagram of a system-on-a-chip imager implementing a disclosed embodiment.

During operation, a calibration correction mode may be enabled during imager use, during which the calibration correction coefficients are loaded into the calibration correction matrix. The calibration coefficients are determined during imager calibration (described below) and are stored in memory in the imager, for example in ROM 142 (FIG. 4). The coefficients are applied to the image data in accordance with Equation (2):

$$RGB_{GC} = C_{calib} * RGB_{RAW} \quad (2)$$

where $RGB_{GC}$ is the RGB data corrected for variation in the spectral response, $C_{calib}$ represents the calibration correction matrix and $RGB_{raw}$ is the raw RGB data input into the calibration module. Equation (2) may alternatively be represented as:

$$\begin{vmatrix} R_{GC} \\ G_{GC} \\ B_{GC} \end{vmatrix} = \begin{vmatrix} a & b & c \\ d & e & f \\ g & h & i \end{vmatrix} \begin{vmatrix} R_{RAW} \\ G_{RAW} \\ B_{RAW} \end{vmatrix} \quad (3)$$

Figure 2:
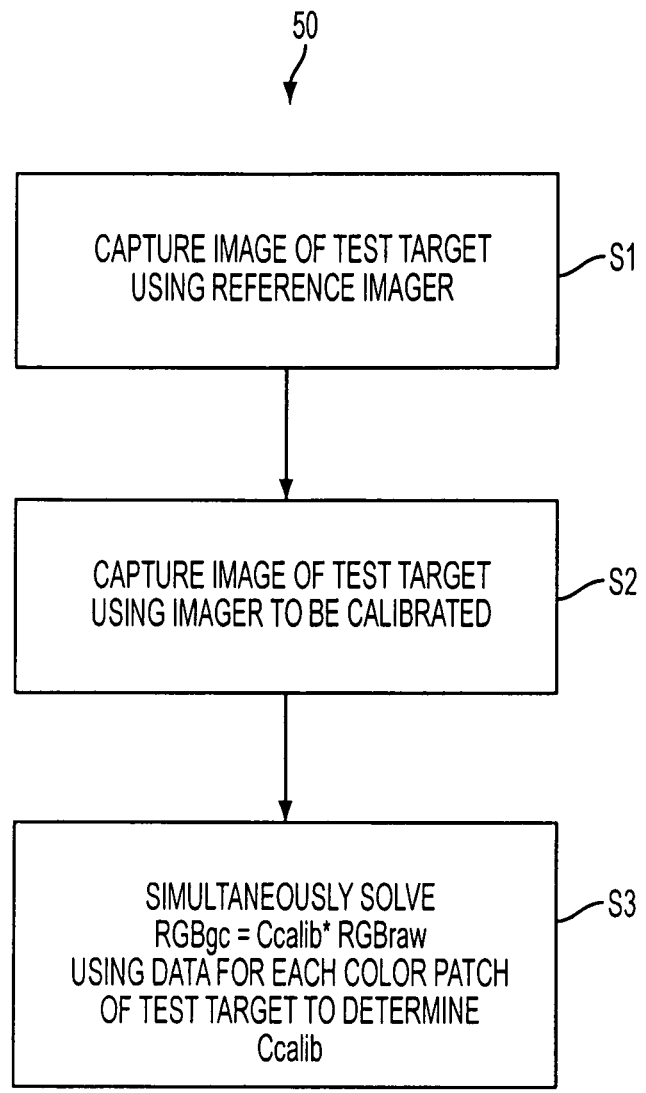
FIG. 2 is a flowchart showing the calibration method of the disclosed embodiments.

The coefficients are determined in a manner similar to calculating the primary color correction matrix. Referring to FIG. 2, an image of a test target is captured using a "reference" imager, as shown in step S1 of method 50. The test target typically contains a variety of colored patches. The test target may be, for example, the known Macbeth color chart where the version for digital cameras having a large collection of patches is preferably used. An image of the test target is then captured using the imager that is to be calibrated (step S2). Then, Equation (2) (above) is solved simultaneously for each set of known $RGB_{GC}$ and $RGB_{RAW}$ data (e.g., for each of the colored patches) to derive the values in $C_{calib}$ (step S3). This can be done for example using the known least squared error method or any other suitable method. The $RGB_{GC}$ data is the data captured using the "reference" imager and the $RGB_{RAW}$ data is that for the imager being calibrated. The image processing steps of method 50 may be carried out as a software program stored in a storage medium or by any other known method.

When calibration correction is not performed, the matrix $C_{calib}$ is a unity matrix, as shown in Equation (4) below, and thus has no effect on the raw RGB data that is input into the gray checker module.

$$C_{calib} = \begin{vmatrix} 1 & 0 & 0 \\ 0 & 1 & 0 \\ 0 & 0 & 1 \end{vmatrix}. \quad (4)$$

However, it is desired that calibration be performed and the calibration correction matrix be applied to the image data so that the white balance operation may appropriately compensate for the difference in spectral response curves between imagers.

Figure 3:
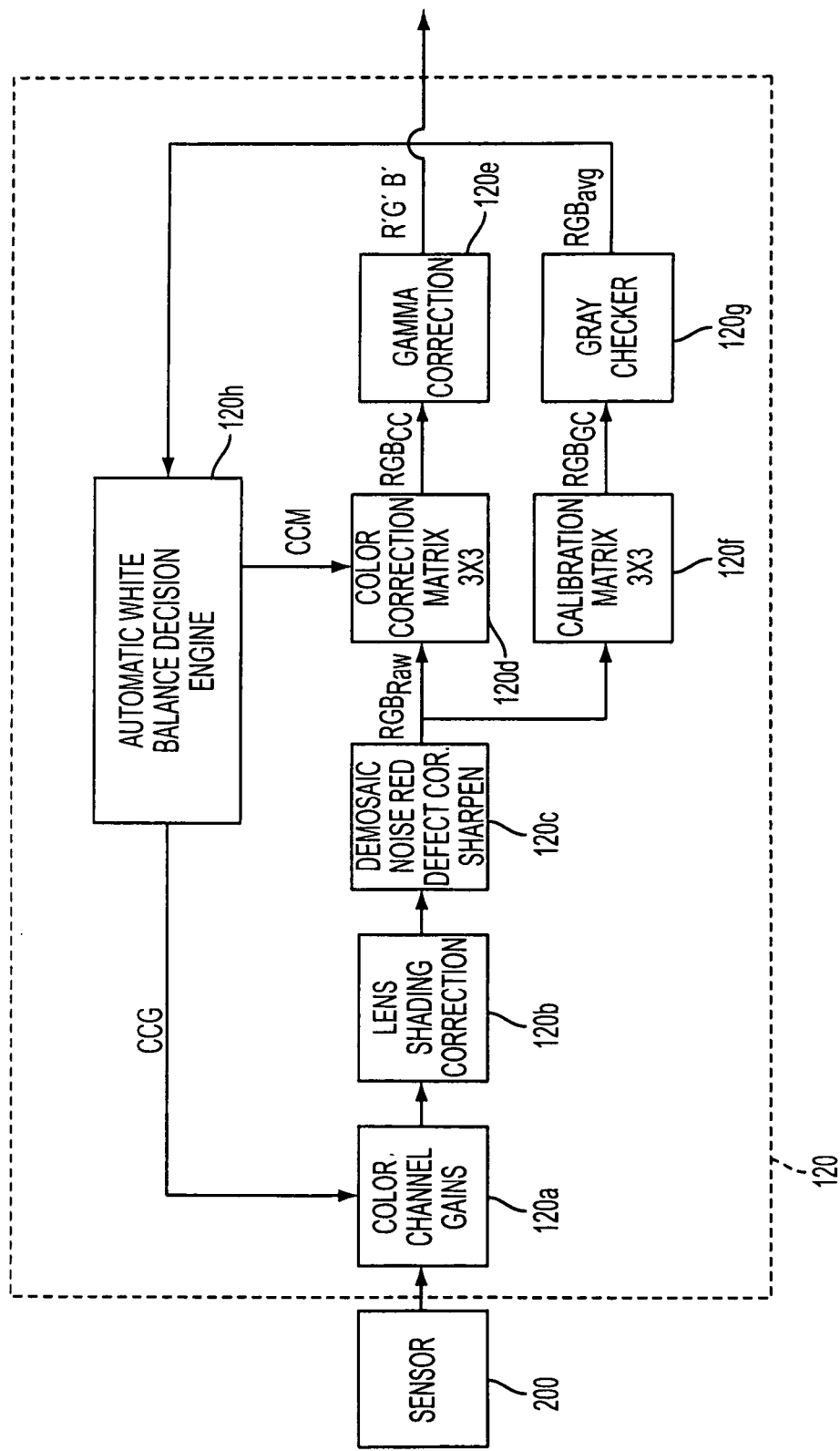
FIG. 3 is a portion of a color processing pipeline including the calibration matrix of disclosed embodiments.

FIG. 3 illustrates a portion of a color processing pipeline 120 used in an imager 100 (FIG. 4) including the calibration matrix module 120f of the disclosed embodiments. The color processing pipeline 120 may include, among other things, a color channel gains correction module 120a, a lens shading correction module 120b, a demosaicing/noise reduction/defect correction/sharpening module 120c, a color correction matrix module 120d, a gamma (color) correction module 120e, the calibration matrix module 120f, a gray checker module 120g and an automatic white balance decision engine 120h. The image data is input from a sensor core 200 and corrected for color channel gains in the color channel gains module 120a using the latest white balance information, which is generally generated by analyzing the previous frame. The image data undergoes lens shading correction to compensate for lens shading in the lens shading module 120b. Demosaicing, noise reduction, defect correction and sharpening occur in module 120c.

The processed image data $RGB_{RAW}$ is separately subjected to both color correction matrix 120d and calibration matrix 120f. The image data to which the color correction matrix 120d is applied ($RGB_{CC}$) is input into the gamma correction module 120e to produce color corrected image data (R'G'B') for the current frame. This image data is output from the color processing pipeline 120 and undergoes further image processing in accordance with known methods. The image data to which the calibration matrix 120f is applied ($RGB_{GC}$) is input into the gray checker module 120g where automatic white balancing statistics are gathered for use in a white balancing application. The image data ($RGB_{avg}$) output from the gray checker module 120g is input into the automatic white balance decision engine 120h. The automatic white balance decision engine 120h calculates the color channel gains (CCG) and color correction matrix (CCM) required to compensate for the illuminant, which the gray checker module 120g determines is applicable to the scene. The color channel gains (CCG) are sent to the color channel gains module 120a and the color correction matrix (CCM) is sent to the color correction matrix module 120d for use on the image data $RGB_{RAW}$ from the next frame.

FIG. 4 illustrates a block diagram of a system-on-a-chip (SOC) imager 100 which implements disclosed embodiments and which may use any type of imager array technology, e.g., CCD, CMOS, etc. The imager 100 comprises a sensor core 200 that communicates with an image processor circuit 110 connected to an output interface 130. A phase-locked loop (PLL) 244 is used as a clock for the sensor core 200. The image processor circuit 110, which is responsible for image and color processing, includes interpolation line buffers 112, decimator line buffers 114, and the color processing pipeline 120. One of the functions of the color processing pipeline 120 is the performance of white balancing in accordance with disclosed embodiments. Image processor circuit 110 may also be implemented as a digital hardware circuit, e.g., an ASIC, a digital signal processor (DSP) or may even be implemented on a stand-alone host computer.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image processor circuit 110, and output interface 130.

Figure 5:
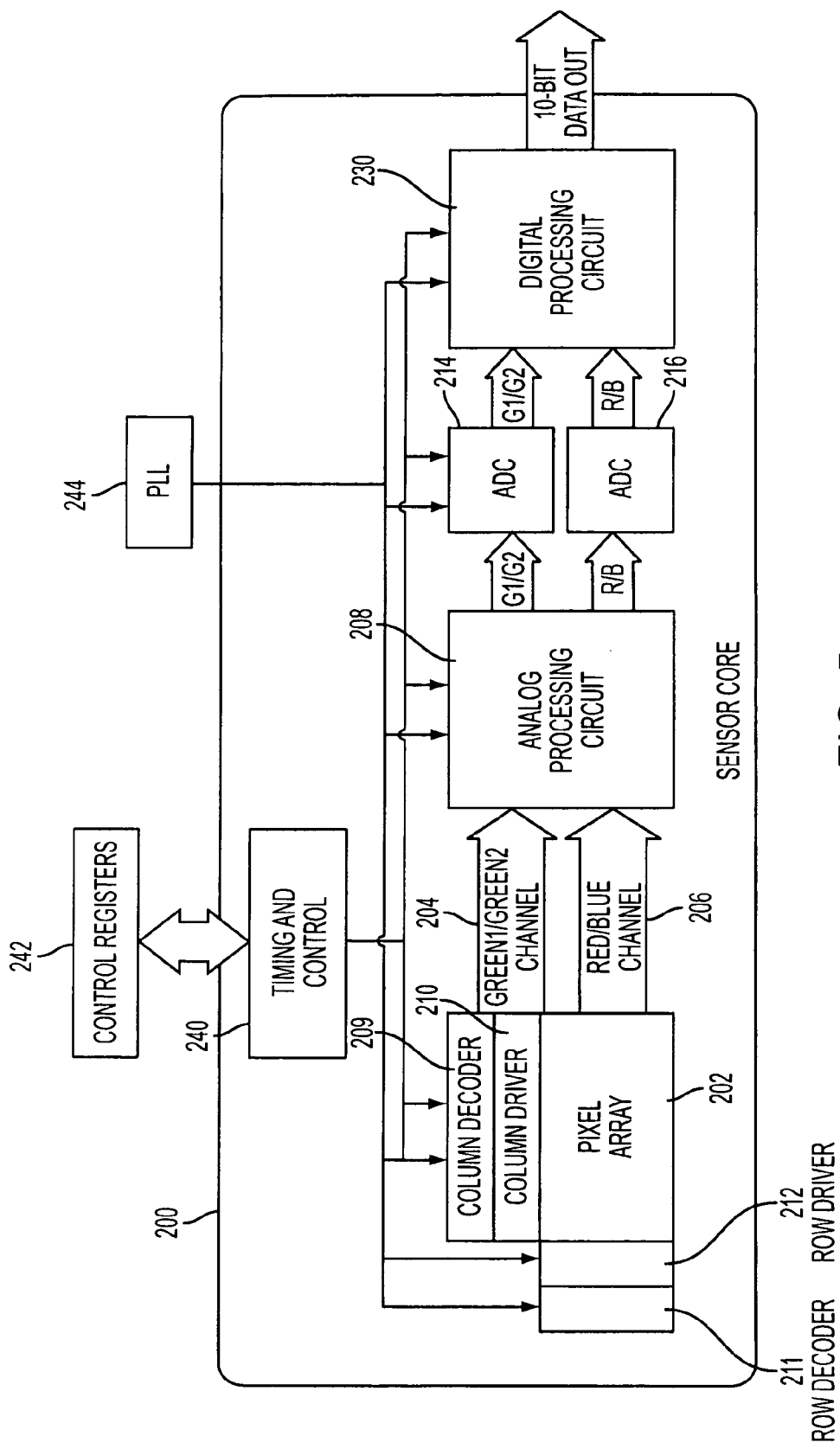
FIG. 5 illustrates an example of a sensor core used in the FIG. 4 imager.

FIG. 5 illustrates a sensor core 200 that may be used in the imager 100 (FIG. 4). The sensor core 200 includes, in one embodiment, a pixel array 202. Pixel array 202 is connected to analog processing circuit 208 by a green1/green2 channel 204 which outputs pixel values corresponding to two green channels of the pixel array 202, and through a red/blue channel 206 which contains pixel values corresponding to the red and blue channels of the pixel array 202.

Although only two channels 204, 206 are illustrated, there are effectively 2 green channels and/or more than the three standard RGB channels. The green1 (i.e., green pixels in the same row as red pixels) and green2 (i.e., green pixels in the same row as blue pixels) (see FIG. 1) signals are read out at different times (using channel 204) and the red and blue signals are read out at different times (using channel 206). The analog processing circuit 208 outputs processed green1/green2 signals G1/G2 to a first analog-to-digital converter (ADC) 214 and processed red/blue signals R/B to a second analog-to-digital converter 216. The outputs of the two analog-to-digital converters 214, 216 are sent to a digital processing circuit 230. It should be noted that the sensor core 200 represents an architecture of a CMOS sensor core; however, disclosed embodiments can be used with any type of solid-state sensor core, including CCD and others.

Connected to, or as part of, the pixel array 202 are row and column decoders 211, 209 and row and column driver circuitry 212, 210 that are controlled by a timing and control circuit 240 to capture images using the pixel array 202. The timing and control circuit 240 uses control registers 242 to determine how the pixel array 202 and other components are controlled. As set forth above, the PLL 244 serves as a clock for the components in the sensor core 200.

The pixel array 202 comprises a plurality of pixels arranged in a predetermined number of columns and rows. For a CMOS imager, the pixels of each row in the pixel array 202 are all turned on at the same time by a row select line and the pixels of each column within the row are selectively output onto column output lines by a column select line. A plurality of row and column select lines are provided for the entire pixel array 202. The row lines are selectively activated by row driver circuitry 212 in response to row decoder 211 and column select lines are selectively activated by a column driver 210 in response to column decoder 209. Thus, a row and column address is provided for each pixel. The timing and control circuit 240 controls the row and column decoders 211, 209 for selecting the appropriate row and column lines for pixel readout, and the row and column driver circuitry 212, 210, which apply driving voltage to the drive transistors of the selected row and column lines.

Each column contains sampling capacitors and switches in the analog processing circuit 208 that read a pixel reset signal Vrst and a pixel image signal Vsig for selected pixels. Because the sensor core 200 uses a green1/green2 channel 204 and a separate red/blue channel 206, analog processing circuit 208 will have the capacity to store Vrst and Vsig signals for green1/green2 and red/blue pixel values. A differential signal (Vrst−Vsig) is produced by differential amplifiers contained in the analog processing circuit 208. This differential signal (Vrst−Vsig) is produced for each pixel value. Thus, the signals G1/G2 and R/B are differential signals representing respective pixel values that are digitized by a respective analog-to-digital converter 214, 216. The analog-to-digital converters 214, 216 supply the digitized G1/G2 and R/B pixel values to the digital processing circuit 230 which forms the digital image output (for example, a 10 bit digital output). The output is sent to the image processor circuit 110 (FIG. 4) for further processing. Although the invention is described using a CMOS array and associated readout circuitry, disclosed embodiments may be used with any type of pixel array, e.g., CCD with associated readout circuitry, or may be implemented on pixel values of an image not associated with a pixel array.

Figure 6:
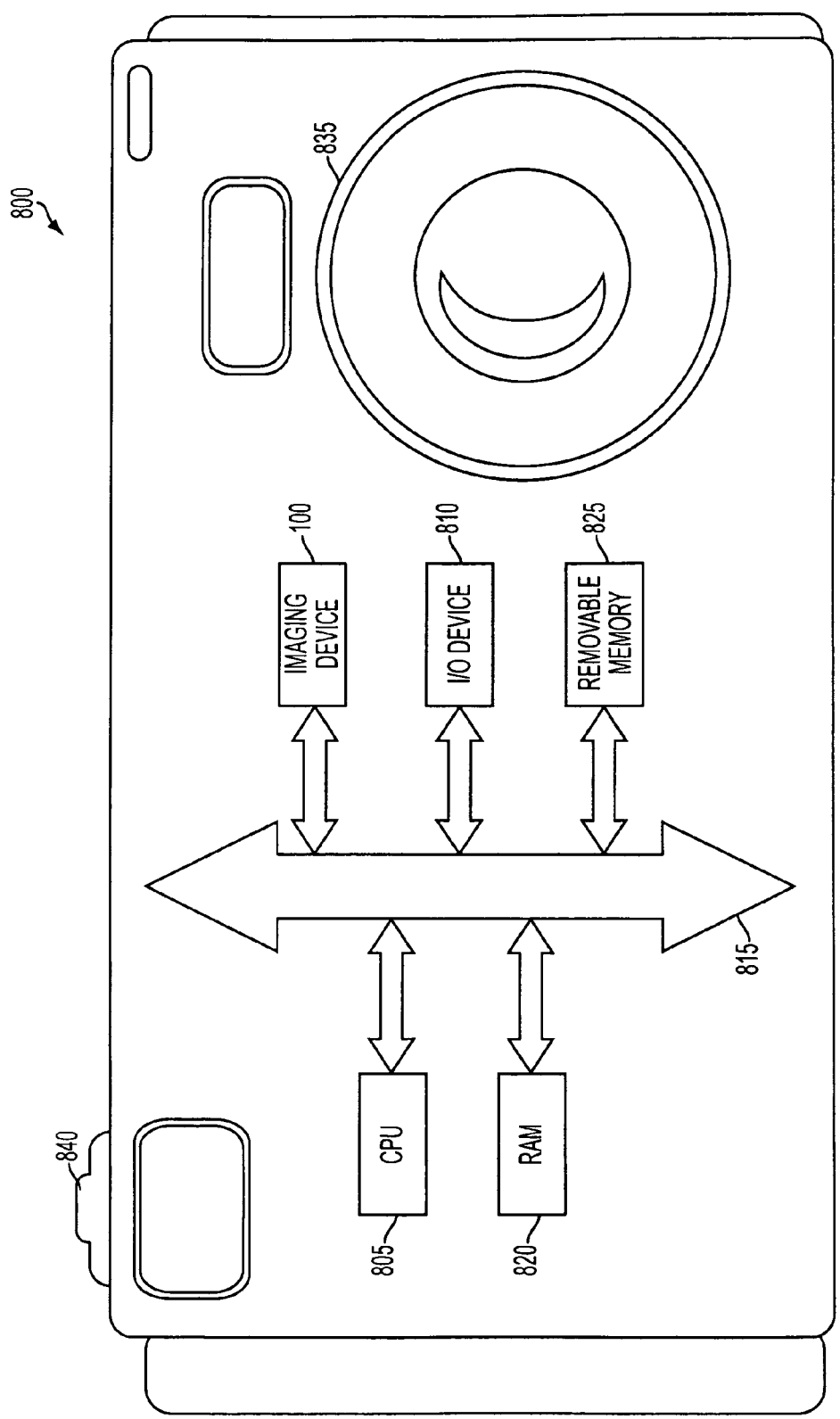
FIG. 6 illustrates a processing system, for example, a digital still or video camera processing system constructed in accordance with disclosed embodiments.

FIG. 6 illustrates a processor system as part of a digital still or video camera system 800 employing a system-on-a-chip imager 100 as illustrated in FIG. 4, which imager 100 provides an automatic white balance operation as described above. The processing system includes a processor 805 (shown as a CPU) which implements system, e.g. camera 800, functions and also controls image flow and image processing. The processor 805 is coupled with other elements of the system, including random access memory 820, removable memory 825 such as a flash or disc memory, one or more input/output devices 810 for entering data or displaying data and/or images and imager 100 through bus 815 which may be one or more busses or bridges linking the processor system components. A lens 835 allows an image or images of an object being viewed to pass to the pixel array 202 of imager 100 when a "shutter release"/"record" button 840 is depressed.

The camera system 800 is only one example of a processing system having digital circuits that could include imagers. Without being limiting, such a system could also include a computer system, cell phone system, scanner, machine vision system, vehicle navigation system, video phone, surveillance system, auto focus system, star tracker system, motion detection system, image stabilization system, and other image processing systems.

While disclosed embodiments have been described in detail, it should be readily understood that the claimed invention is not limited to the disclosed embodiments. Rather the disclosed embodiments can be modified to incorporate any number of variations, alterations, substitutions or equivalent arrangements not heretofore described.

What is claimed as new and desired to be protected by Letters Patent of the United States is:

1. A method of processing a plurality of pixel signals corresponding to an image using an image processor circuit in an imager, the method comprising: with the image processor circuit, capturing a first frame of an image; with the image processor circuit, modifying the pixels signals of the first frame of the image by applying a calibration matrix to each pixel signal of the first frame of the image, wherein the calibration matrix is determined during imager calibration during manufacturing of the imager, and wherein the calibration matrix is configured to correct for fixed characteristics of the image processor circuit that are independent of illumination conditions; with the image processor circuit, determining automatic white balancing statistics for the first frame of the image based on the pixel signals to which the calibration matrix has been applied; with the image processor circuit, capturing a next frame of an image; and with the image processor circuit, adjusting each pixel signal of the next frame of the image by performing automatic white balancing using the determined automatic white balance statistics for the first frame of the image.

2. The method of claim 1, wherein the calibration matrix is obtained from a storage location.

3. The method of claim 1, wherein the calibration matrix corrects for variation in spectral response curves of the imager.

4. The method of claim 1, further comprising repeating the steps of applying the calibration matrix, determining automatic white balancing statistics and adjusting each pixel signal of the next frame of the image for subsequent frames of the image.

5. A method of calibrating an imaging system during manufacturing of the imaging system, the method comprising:
    acquiring a first test image of a test target using the imaging system;
    acquiring a second test image of the test target using a reference imaging system;
    computing a calibration matrix from the first and second test images, wherein the computed calibration matrix is configured to correct a spectral response curve of the imaging system to correspond to a spectral response curve of the reference imaging system; and
    storing the calibration matrix on the imaging system for use in an automatic white balancing operation to be performed by the imaging system.

6. The method of claim 5, wherein the test target includes a plurality of colors.

7. The method of claim 6, wherein computing the calibration matrix further comprises:
    determining a first set of image signal data for each of the colors of the test target for the first test image;
    determining a second set of image signal data for each of the colors of the test target for the second test image; and
    simultaneously solving an equation involving the first and second sets of image signal data for each of the colors of the test target to determine the calibration matrix.

8. The method of claim 7, wherein simultaneously solving the equation involving the first and second sets of image signal data comprises performing a least squared error method on the first and second sets of image signal data.

9. The method of claim 7, wherein simultaneously solving the equation involving the first and second sets of image signal data for each of the colors of the test target comprises solving the equation $RGB_{GC}=C_{calib}*RGB_{RAW}$ for each of the colors of the test target, wherein $RGB_{GC}$ is the image signal data for the second test image, $RGB_{RAW}$ is the image signal data for the first test image and $C_{calib}$ is the calibration matrix.

10. The method of claim 6, wherein the calibration matrix is a 3×3 matrix.

11. An imaging device comprising: an array of pixels for capturing an image and providing pixel output signals; a storage device for storing a calibration matrix, wherein the calibration matrix is determined during imager calibration during manufacturing of the imager; and a processing circuit for processing the pixel output signals produced by the array, the processing circuit being configured to: alter each pixel output signal of a first frame of the image by applying the calibration matrix to each pixel output signal of a first frame of the image; determine automatic white balancing statistics for the first frame of the image based on the pixel output signals to which the calibration matrix has been applied; and adjust each pixel output signal of a next frame of the image by performing automatic white balancing using the determined automatic white balance statistics for the first frame of the image.

12. The imaging device of claim 11, wherein the calibration matrix is stored in the storage device.

13. The imaging device of claim 11, wherein the calibration matrix corrects for variation in spectral response curves of the imaging device.

14. The imaging device of claim 11, wherein the calibration matrix is a 3×3 matrix.

15. A digital camera comprising:
a pixel array for capturing an image received through a lens;
a storage area for storing a calibration matrix; and
a pixel array processing circuit configured to perform an automatic white balance adjustment on the pixel signals for a captured image using the calibration matrix, wherein the calibration matrix is determined during imager calibration using a reference imaging system during manufacturing of the digital camera, wherein the calibration matrix is stored in the storage area, and wherein the automatic white balance adjustment is based on color channel gains determined from a second captured image to which the calibration matrix has been applied.

16. The digital camera of claim 15, wherein the calibration matrix corrects for variation in spectral response curves of the imaging device.

17. A method of operating an imager having an image processor circuit, comprising: with the image processor circuit, capturing an image of a scene illuminated by an illuminant; with the image processor circuit, wherein the calibration matrix is determined during imager calibration during manufacturing of the imager, altering the image by applying a calibration matrix that corrects for differences between the imager and a reference imager to the image of the scene; with the image processor circuit, determining spectral properties of the illuminant using the altered image to which the calibration matrix has been applied; with the image processor circuit, determining color channel gains based on the determined spectral properties of the illuminant; with the image processor circuit, capturing an additional image of the scene; and with the image processor circuit, altering the additional image using the color channel gains.

18. The method defined in claim 17, further comprising:
with the image processor circuit, modifying the image by applying a color correction matrix to the image.

19. The method defined in claim 17, further comprising:
with the image processor circuit, modifying the image by applying a color correction matrix to the image, wherein the color correction matrix is based on a previously captured image of the scene that was captured using the image processor circuit.

20. The method defined in claim 19, further comprising:
with the image processor circuit, applying a gamma correction to the modified image to which the color correction matrix was applied; and
with the image processor circuit, outputting the image.

21. The method defined in claim 20, further comprising:
with the image processor circuit, determining a new color correction matrix based on the determined spectral properties of the illuminant.

* * * * *